United States Patent [19]

Van Klinken et al.

[11] 3,925,197
[45] Dec. 9, 1975

[54] HYDRODESULFURIZATION PROCESS

[75] Inventors: Jakob Van Klinken; Frits M. Dautzenberg, both of Amsterdam, Netherlands

[73] Assignee: Shell Oil Company, Houston, Tex.

[22] Filed: Dec. 4, 1972

[21] Appl. No.: 312,246

[30] Foreign Application Priority Data
Dec. 7, 1971 United Kingdom............... 56803/71

[52] U.S. Cl. .............................................. 208/216
[51] Int. Cl.............................................. C10g 23/02
[58] Field of Search............................ 208/216, 217

[56] References Cited
UNITED STATES PATENTS

| | | | |
|---|---|---|---|
| 3,242,101 | 3/1966 | Erickson et al..................... | 208/216 |
| 3,471,399 | 10/1969 | O'Hara ................................ | 208/216 |
| 3,531,398 | 9/1970 | Adams et al........................ | 208/216 |
| 3,686,095 | 8/1972 | Coons, Jr. et al.................. | 208/216 |
| 3,702,238 | 11/1972 | Armistead et al. ................ | 208/216 |
| 3,753,894 | 8/1973 | Shoemaker et al................ | 208/216 |

*Primary Examiner*—Delbert E. Gantz
*Assistant Examiner*—G. J. Crasanakis
*Attorney, Agent, or Firm*—Ronald R. Reper

[57] ABSTRACT

A process for fixed bed hydrodesulphurization of residues with a total $Ni + V$ content of at most 120 ppmw and a $C_5$-asphaltene content above 0.5%w, over a catalyst having a pore volume above 0.30 ml/g with less than 10% of the pore volume in pores with a diameter above 100 nm (nanometers) and such a specific average pore diameter, p, and specific average particle diameter, d, that the quotient $p/(d)^{0.9}$ meets the requirement $3 \times 10^{-4} \times (P_H)^2$   $p/(d)^{0.9}$   $17 \times 10^{-4} \times (P_H)^2$, in which $P_H$ is the hydrogen partial pressure ($P$ in nm, $d$ in mm, $P_H$ in bar). Preferably the process is conducted at a $pH_2$ of 80–180 bar, and a temperature of 300°–475°C over an alumina or silica-alumina based catalyst comprising nickel and/or cobalt and molybdenum and/or tungsten and having a pore diameter of 4.6 to 25.6 nm, a particle diameter of 0.5 – 2.5 nm and a sharp pore diameter distribution.

8 Claims, No Drawings

HYDRODESULFURIZATION PROCESS

BACKGROUND OF THE INVENTION

The invention relates to a process for the catalytic hydrodesulphurization of residual hydrocarbon oils having a total vanadium and nickel content of at most 120 ppmw, in which during operation no continuous or periodic replenishment of the catalyst present in the desulphurization reactor takes place.

Residual hydrocarbon oils generally contain a considerable amount of sulphur compounds. When these oils are applied as fuel, the sulphur present in the sulphur compounds is converted into sulphur dioxide which is discharged to the atmosphere. In order to restrict air pollution as much as possible in the combustion of these oils, it is desirable for the sulphur content to be reduced. This can be achieved by catalytic hydrodesulphurization of the oils. For this purpose processes can be applied in which during operation continuous or periodic replenishment of the catalyst present in the desulphurization reactor takes place, or processes in which such a replenishment does not take place. For the sake of brevity the latter processes, of which the process according to the invention is an example, will be referred to in this patent application as "catalytic hydrodesulphurization without catalyst replenishment."

The catalytic hydrodesulphurization of residual hydrocarbon oils involves certain problems which do not arise when this process is applied for the hydrodesulphurization of hydrocarbon oil distillates. These problems result from the fact that most residual hydrocarbon oils, such as residues obtained in the distillation of crude oils under atmospheric or reduced pressure, contain high-molecular nondistillable compounds such as asphaltenes and metal compounds, particularly vanadium and nickel compounds, which metal compounds are for a considerable part bound to the asphaltenes. During the hydrodesulphurization the asphaltenes and the vanadium and nickel compounds tend to deposit on the catalyst particles. A portion of the high-molecular compounds which deposit on the catalyst particles is converted into coke. As a result of the increasing concentration of vanadium, nickel and coke on the catalyst, a very rapid deactivation of the catalyst occurs. According as the activity of the catalyst decreases, higher temperatures must be applied to maintain the desired degree of desulphurization. However, at higher temperatures hydrocracking reactions begin to play a more important role and a fuel oil of varying quality is obtained.

In order to prolong catalyst life it has already been suggested that the asphaltenes should be removed from the feed before the latter is desulphurized and that the separated asphaltenes should be subsequently remixed with the desulphurized product. However, this mode of operation requires an additional process step, namely deasphaltenization, and, moreover, presents certain other drawbacks. Therefore, preference is given to a method of hydrodesulphurization according to which the feed as such, i.e. including the asphaltenes is processed. However, this embodiment of the process requires catalysts having a better resistance to deactivation than those which are now generally recommended for this purpose.

An investigation into the catalytic hydrodesulphurization without catalyst replenishment of residual hydrocarbon oils having a total vanadium and nickel content of at most 120 ppmw has revealed that good catalysts for this purpose must comply with a number of requirements with regard to their particle diameter and porosity. These requirements for good catalysts partly depend on the hydrogen partial pressure at which the hydrodesulphurization is carried out. By a good catalyst for the hydrodesulphurization of residual hydrocarbon oils without catalyst replenishment is meant in this patent application a catalyst which has a sufficiently long lifetime, so that per kg catalyst an acceptable quantity of residual hydrocarbon oil can be desulphurized before the catalyst shows a rapid deactivation, and which catalyst has a sufficiently high average activity, so that a final product with the desired low sulphur content is obtained at an acceptable space velocity.

SUMMARY OF THE INVENTION

A fixed bed process for the catalytic hydrodesulphurization at hydrogen partial pressure of at least 80 and at most 180 bar of residual hydrocarbon oils having a total vanadium and nickel content of at most 120 ppmw and a $C_5$-asphaltene content above 0.5%w, wherein a catalyst is applied comprising 0.5–20% w nickel and/or cobalt and 2.5–60% w molybdenum and/or tungsten on an alumina or a silicaalumina carrier, said catalyst having such a specific average pore diameter, p, in nm, and a specific average particle diameter, d, in mm, that the quotient $p/(d)^{0.9}$ meets the general requirement $4.0 \leq p/(d)^{0.9} \leq 20.0$; and said catalyst having a pore volume above 0.45 ml/g, with at least 0.4 ml/g of said pore volume in pores having a diameter of at least $0.7 \times p$ and at most $1.7 \times p$, and a sharp pore diameter distribution characterized by a. less than 20% of the pore volume in pores with a diameter smaller than $0.7 \times p$,
b. less than 20% of the pore volume in pores with a diameter larger than $1.7 \times p$, and
c. less than 10% of the pore volume in pores with a diameter larger than 100 nm.

RELATED APPLICATIONS

Parts of the material disclosed herein are claimed separately in three related applications all filed on the same date as this application. These related applications, Ser. Nos. 312,245, 312,244, and 312,100, are based on United Kingdom patent applications 56801/71, 56802/71 and 40907/72.

DETAILED DESCRIPTION

It has been found that for the catalytic hydrodesulphurization without catalyst replenishment of residual hydrocarbon oils having a total vanadium and nickel content of at most 120 ppmw the requirements with respect to particle diameter and porosity of a good catalyst are as follows. In the first place the catalyst particles should have a pore volume above 0.30 ml/g, while less than 10% of the pore volume should be present in pores with a diameter above 100 nm (nanometer = $10^{-9}$ meters). Further the catalyst particles should have such a specific average pore diameter ($p$) and specific average particle diameter (d) that the quotient $p/(d)^{0.9}$ meets the requirement $3 \times 10^{-4} \times (P_{H_2})^2 \leq p/(d)^{0.9} \leq 17 \times 10^{-4} \times (P_{H_2})^2$, in which $P_{H_2}$ is the hydrogen partial pressure applied ($p$ in nm, $d$ in mm, $P_{H_2}$ in bar). The above-mentioned values of $d$ and $p$ have been defined as follows on the basis of their method of determination.

The way in which $d$ is determined depends on the shape of the catalyst particles. If they have such a shape that the particle diameter distribution of the catalyst can be determined with the aid of a sieve analysis, $d$ is determined as follows. After a complete sieve analysis of a representative catalyst sample has been carried out, $d$ is read off from a graph in which for every successive sieve fraction the percentage by weight, based on the total weight of the catalyst sample has been cumulatively plotted as a function of the linear average particle diameter of the relevant sieve fraction; d is the particle diameter corresponding to 50% of the total weight. This method can be used to determine $d$ of spherical and granular materials and materials with a similar shape such as extrudates and pellets having a length/diameter ratio between 0.9 and 1.1. The determination of $d$ of extrudates and pellets having a length/diameter ratio smaller than 0.9 or larger than 1.1 and similar cylindrically shaped materials, of which the particle diameter distribution cannot be determined with the aid of a sieve analysis, is carried out as follows. After a complete length distribution analysis ( in case the length/diameter ratio is smaller than 0.9) or after a complete diameter distribution analysis (in case the length/diameter ratio is larger than 1.1) of a representative catalyst sample has been carried out, $d$ is read off from a graph in which for every successive length and diameter fraction, respectively, the percentage by weight, based on the total weight of the catalyst sample, has been cumulatively plotted as a function of the linear average size of the relevant fraction; d is the value corresponding to 50% of the total weight.

After a determination of the complete pore diameter distribution of a catalyst sample has been carried out, $p$ is read off from a graph in which for the pore diameter range of 0–100 nm, for every successive pore volume increment smaller than or equal to 10% of the pore volume, the quotient of the pore volume increment and the corresponding pore diameter interval has been cumulatively plotted as a function of the linear average pore diameter over the relevant pore diameter interval; $p$ is the pore diameter corresponding to 50% of the total quotient at 100 nm.

A determination of the complete pore diameter distribution of the catalyst may very suitably be carried out with the aid of the nitrogen adsorption/desorption method (as described by E. V. Ballou and O. K. Doolen in Analytical Chemistry 32, 532 (1960)) combined with the mercury penetration method (as described by H. L. Ritter and L. C. Drake in Industrial and Engineering Chemistry, Analytical Edition 17, 787 (1945)), applying mercury pressures of 1 – 2000 bar. In this case, the pore diameter distribution of the catalyst in the pore diameter range below and including 7.5 nm is preferably calculated from the nitrogen desorption isotherm (assuming cylindrical pores) according to the method described by J. C. P. Brockhoff and J. H. de Boor in Journal of Catalysis 10, 377 (1968) and the pore diameter distribution of the catalyst in the pore diameter range above 7.5 nm is preferably calculated with the aid of the formula:

$$\text{pore diameter (in nm)} = \frac{15000}{\text{absolute mercury pressure (in bar)}}$$

The present patent application therefore relates to a process for the catalytic hydrodesulphurization without catalys replenishment of residual hydrocarbon oils having a total vanadium and nickel content of at most 120 ppmw, in which process a catalyst is applied having a pore volume above 0.30 ml/g, less than 10% of the pore volume being present in pores with a diameter above 100 nm and such a specific average pore diameter ($p$) and specific average particle diameter ($d$) that the quotient $p/(d)^{0.9}$ meets the requirement $$3 \times 10^{-4} \times (P_{H_2})^2 \le p/(d)^{0.9} \le 17 \times 10^{-4} \times (P_{H_2})^2,$$

in which $P_{H_2}$ is the hydrogen partial pressure applied ($p$ in mm, $d$ in mm, $p_{H_2}$ in bar).

The residual hydrocarbon oils which are hydrodesulphurized according to the invention usually have a total vanadium and nickel content of at least 30 ppmw and a $C_5$-asphaltene content above 0.5 %W;

The catalysts applied according to the invention are characterized by a given relation between their average pore diameter and average particle diameter at a given hydrogen partial pressure. It is essential that the average pore diameter and average particle diameter used for the characterization of the catalysts have been determined according to the methods specified above for the specific average pore diameter and specific average particle diameter because, if for the characterization of the catalysts use is made of an average pore diameter or an average particle diameter determined by methods other than those specified above for the specific average pore diameter and specific average particle diameter (for example an average pore diameter calculated as four times the quotient of the pore volume and the surface area or an average particle diameter calculated as the linear average), entirely different results may be obtained.

The relation found between $p$, $d$ and $P_{H_2}$ may serve three different purposes. In the first place the relation offers the possibility of determining the range within which $P_{H_2}$ should be selected to obtain good results with a catalyst having a given $p$ and $d$. Further the relation may be applied to determine the range within which $d$ of a catalyst material with a given $p$ should be selected to obtain good results at a given $P_{H_2}$. Finally the relation makes it possible to determine the range within which $p$ of a catalyst with a given d should be selected to obtain good results at a given $P_{H_2}$. The most suitable values for $P_{H_2}$, $d$ and $p$, respectively, within the ranges found are among others determined by the composition of the hydrocarbon oil to be desulphurized.

The catalysts which are applied in the process according to the invention preferably have a pore volume above 0.45 ml/g and a surface area above 50 m²/g and more in particular a surface area above 100 m²/g. It is further preferred that the catalysts have such a $p$ and $d$ that the quotient $p/(d)^{0.9}$ meets the requirement $34 \times 10^{-5} \times (P_{H_2})^2 \le p/(d)^{0.9} \le 141 \times 10^{-5} \times (P_{H_2})^2$, and in particular that this quotient meets the requirement $34 \times 10^{-5} \times (P_{H_2})^2 \le p/(d)^{0.9} \le 10^{-3} \times (P_{H_2})^2$.

If the hydrodesulphurization according to the invention is carried out at a $P_H$ between 80 and 180 bar, the following catalysts are preferably applied:

a. For hydrodesulphurization at a $P_{H_2}$ of at least 80 but less than 110 bar, a catalyst having such a p and d that the quotient $p/(d)^{0.9}$ meets the requirement $4.0 \le p/(d)^{0.9} \le 9.0$.

b. For hydrodesulphurization at a $P_{H_2}$ of at least 100 but less than 135 bar, a catalyst having such a p and d that the quotient $p/(d)^{0.9}$ meets the requirement $7.0 \le p/(d)^{0.9} \le 12.0$, and in particular such a $p$ and $d$ that this quotient meets the requirement $7.0 < p/(d)^{0.9} \leq 10.0$.

c. For hydrodesulphurization at a $P_{H_2}$ of at least 135 and at most 180 bar, a catalyst having such a $p$ and $d$ that the quotient $p/(d)^{0.9}$ meets the requirement $11.5 \leq p/(d)^{0.9} \leq 20.0$, and in particular such a $p$ and $d$ that this quotient meets the requirement $11.5 \leq p/(d)^{0.9} \leq 16.5$.

The hydrodesulphurization according to the invention is preferably carried out in the presence of a catalyst comprising one or more metals having hydrogenation activity on a carrier, which catalyst has such a $p$ and $d$ that the quotient $p/(d)^{0.9}$ meets the requirement $4.0 \quad p/(d)^{0.9} \quad 20.0$, and which catalyst has moreover a pore volume above 0.45 ml/g and usually above 0.5 ml/g with at least 0.4 ml/g and usually 0.4–0.8 ml/g of the pore volume in pores with a diameter of at least $0.7 \times p$ and at most $1.7 \times p$, and a sharp pore diameter distribution, characterized by a. less than 20% of the pore volume in pores with a diameter smaller than $0.7 \times p$, b. less than 20% of the pore volume in pores with a diameter larger than $1.7 \times p$, and c. less than 10% of the pore volume in pores with a diameter larger than 100 mm.

The latter catalysts are novel compositions. The present patent application therefore also relates to these catalysts as novel compositions and to their use as catalysts for the catalytic conversion of hydro-carbon oils, in particular to their use for the present hydrodesulphurization process. If these novel catalysts are applied at a $P_{H_2}$ which, depending on their quotient $p/(d)^{0.9}$, is selected within the three preferred $P_{H_2}$ ranges mentioned hereinbefore, they show an excellent performance for reside hydrodesulphurization.

The catalysts according to the invention preferably comprise 0.5 – 20 pbw and in particular 0.5 – 10 pbw nickel and/or cobalt and 2.5 – 60 pbw and in particular 2.5 – 30 pbw molybdenum and/or tungsten per 100 pbw carrier. The atomic ratio between nickel and/or cobalt on the one hand and molybdenum and/or tungsten on the other hand may vary widely, but is preferably between 0.1 and 5. Examples of very suitable metal combinations for the present catalysts are nickel/tungsten, nickel/molybdenum, cobalt/molybdenum and nickel/cobalt/molybdenum. The metals may be present on the carrier in the metallized form or in the form of their oxides or sulphides. Preference is given to catalysts according to the invention in which the metals are present on the carriers in the form of their sulphides. Sulphidation of the present catalysts may be carried out by any one of the techniques for sulphidation of catalysts well-known in the art. Sulphidation may, for instance, be carried out by contacting the catalysts with a sulphur-containing gas such as a mixture of hydrogen and hydrogen sulphide, a mixture of hydrogen and carbon disulphide, or a mixture of hydrogen and a mercaptan, such as butyl mercaptan. Sulphidation may also be carried out by contacting the catalysts with hydrogen and with a sulphur-containing hydrocarbon oil, such as a sulphur-containing kerosine or gas oil. In addition to the abovementioned catalytically active metals, the catalysts may contain other catalytically active metals and promotors such as phosphorus, boron and halogens, like fluorine and chlorine. Very suitable carriers for the present catalysts are oxides of the elements of Group II, III or IV of the Periodic Table of Elements or mixtures of the said oxides, such as silica, alumina, magnesia, zirconia, thoria, boria, hafnia, silicaalumina, silica-magnesia, alumina-magnesia and silica-zirconia.

The preparation of the catalysts according to the invention may be carried out by depositing the metals concerned on a carrier having such a pore diameter distribution and specific average pore diameter that after deposition the metals thereon a catalyst is obtained which meets the requirements of the invention, either as such or after the specific average catalyst particle diameter has been increased or decreased.

The porosity of the finished catalyst depends to a certain extent on the applied metal load. In general, it may be said that starting from a carrier with a given porosity, a finished catalyst with a lower porosity is obtained according as a higher metal load is applied. This phenomenon plays only a minor role if relatively low metal loads, i.e. loads of about 20 pbw metal, or less, per 100 pbw carrier, are applied. This means that at relatively low metal loads the porosity of the finished catalyst is mainly determined by the porosity of the applied carrier and that for the preparation of catalysts according to the invention with a relatively low metal load, carriers should be selected having a porosity which differs only little from the desired porosity of the finished catalyst. At higher metal loads, however, the influence of meta load on porosity becomes more important and application of a high metal load may serve as a means to prepare catalysts according to the invention starting from carriers of which the porosity is too high. The porosity of a carrier may also be influenced by means of a high-temperature treatment either in the presence or in the absence of steam.

The porosity of a carrier is mainly determined by the way in which the carrier has been prepared. Catalyst carriers of the metal-oxides type are usually prepared by adding to one or more aqueous solutions of the salts of the metals concerned one or more gelating agents, as a result of which the metals precipitate in the form of metal hydroxide gels, which are subsequently shaped and calcined. Usually, before being shaped the metal hydroxide gels are allowed to age for some time. During the preparation of the carrier there is ample opportunity to influence the porosity of the carrier. The porosity of the final carrier depends, among other factors on the rate of addition of the gelating agents, and on the temperature and pH applied during the formation of the gel. The porosity of the final carrier may also be influenced by addition of certain chemicals to the gel, such as phosphorus and/or halogen compounds. If ageing is applied, the porosity of the final carrier also depends on the ageing time and the temperature and pH applied during ageing. In the preparation of mixed metal oxide carriers a further aspect that is important with a view to the porosity of the final carriers, is the way in which the metal hydroxide gels are precipitated: simultaneously or separately, e.g. one on top of the other. The porosity of the final carrier further depends on the way in which the carrier particles are shaped, on the conditions applied during shaping, and on the temperature applied during calcination.

During shaping the porosity of the carrier particles is influenced, for example, by the type and amount of peptizing agents and binders which are usually added during this stage of carrier manufacture, by the addition of certain chemicals, and by the addition of small amounts of inert materials such as silica and/or zirconia. If the carrier particles are shaped by extrusion, the porosity of the final carrier is influenced by the extrusion pressure applied. If use is made of the spray-drying technique, the porosity of the carrier is influenced by the spray temperature and spray pressure applied.

Catalysts according to the present invention may be prepared by any one of the techniques for the preparation of multi-component supported catalysts well-known in the art. It is not necessary that the catalytically active metals are deposited on a finished carrier; they may also be incorporated into the carrier material during the preparation thereof, for example, prior to shaping. Incorporating the catalytically active metals into the carrier at an early stage of the catalyst manufacture may also have a strong influence on the porosity of the finished catalyst. The catalysts according to the invention are preferably prepared by single or multistep co-impregnation of a carrier with an aqueous solution comprising one or more nickel and/or cobalt compounds and one or more molybdenum and/or tungsten compounds, followed by drying and calcining. If the impregnation is carried out in several steps, the material may be dried and calcined, if desired, between the successive steps of impregnation. Drying and calcining are preferably carried out at temperatures between 50° and 150°C and between 150° and 550°C, respectively. Examples of suitable water-soluble compounds of nickel, cobalt, molybednum and tungsten which may be applied in the preparation of the present catalysts are nitrates, chlorides, carbonates, formates and acetates of nickel and cobalt, ammonium molybdate and ammonium tungstate. In order to increase the solubility of these compounds and to stabilize the solutions, certain compounds such as ammonium hydroxide, monoethanolamine and sorbitol may be added to the solutions.

As carriers for the catalysts according to the invention aluminas and silica-aluminas are preferred. Very suitable carriers are alumina particles prepared by spray-drying of an alumina gel, followed by shaping of the spray-dried microparticles into larger particles, e.g., by extrusion, and spherical alumuna particles obtained by the well-known oil drop method. The latter method comprises formation of an alumina hydrosol, combining the hydrosol with a suitable gelating agent and dispersing the mixture as droplets into an oil which is kept at an elevated temperature; the droples are allowed to remain in the oil until they have solidified to spherical hydrogel particles, which are subsequently isolated, washed, dried and calcined. Very suitable silica-alumina carriers for the present catalysts are cogels of aluminium hydroxide gel on silica hydrogel. These cogels are preferably prepared by first precipitating a silica hydrogel from an aqueous, silicate-ions containing solution by the addition of a mineral acid, subsequently adding a water-soluble aluminium salt to the mixture, and then precipitating an aluminium hydroxide gel by adding an alkaline-reacting compound. It is preferred that the silica hydrogel produced be allowed to age for some time at an elevated temperature before the cogel preparation is continued. The ageing conditions, particularly the ageing time and the ageing temperature, have a strong influence on the porosity of the final cogel. The preparation of catalysts according to the invention based on the above cogels may e.g. be carried out as follows. In the first place the cogel is shaped, e.g. by extrusion, followed by drying and calcining of the hydrogel particles. Subsequently, the xerogel particles thus obtained are neutralized with a nitrogen base and dried. Finally, the catalytically active metals are deposited on the carrier by impregnating the latter with one or more aqueous solutions comprising salts of the metals concerned, followed by drying and calcining of the composition. The preparation of catalysts according to the invention based on the above cogels may also be carried out by the following simplified procedure. The catalytically active metals are incorporated into the cogel by mixing the latter with one or more aqueous solutions comprising salts of the metals concerned, after which the composition is shaped, e.g., by extrusion, dried and calcined.

The novel catalysts used in the present invention may be applied for the catalytic conversion of hydrocarbon oils, such as catalytic hydrodesulphurization and catalytic hydrocracking of residual hydrocarbon oils. They are especially of importance for the catalytic hydrodesulphurization without catalyst replenishment of residual hydrocarbon oils having a total vanadium and nickel content of at most 120 ppmw. If the novel catalysts of which the quotient $p/(d)^{0.9}$ meets the requirement $4.0 \leq p/(d)^{0.9} \leq 9.0$, $7.0 \leq p/(d)^{0.9} \leq 12.0$ or $11.5 \leq p/(d)^{0.9} \leq 20.0$, are applied for this purpose at a $P_{H_2}$ of 80 – 110, 110 – 135 or 135 – 180 bar, respectively, they show an excellent performance with respect to catalyst life and average activity.

The catalytic hydrodesulphurization of residual hydrocarbon oils without catalyst replenishment is preferably carried out by passing the hydrocarbon oil at elevated temperature and pressure and in the presence of hydrogen in upward, downward or radial direction through a vertically disposed fixed catalyst bed. The hydrocarbon oil to be desulphurized may be fully or partly saturated with hydrogen and in addition to the hydrocarbon phase and the catalyst phase a hydrogen-containing gas phase may be present in the reactor. Further, part of the liquid product which contains or does not contain dissolved hydrogen, hydrogen sulphide and/or hydrocarbon gases, may be recycled to the catalyst bed.

The hydrodesulphurization may be carried out either in a single reactor or in two or more reactors. As a rule hydrodesulphurization reactors contain more than one catalyst bed. The catalysts applied in the separate catalyst beds and/or in the separate reactors may differ from each other with respect to their $p$ and/or $d$ and/or chemical composition. If several reactors are applied, it is possible to use all these reactors simultaneously for carrying out the desulphurization reaction. It is also possible to use the reactors alternately for desulphurization, in which case desulphurization is carried out in one or more reactors, the catalyst being replaced in the other reactors.

Hydrodesulphurization of residual hydrocarbon oils without catalyst replenishment may very suitably be carried out by passing the hydrocarbon oil together with hydrogen through a vertically disposed fixed catalyst bed in the upward direction, the liquid and/or gas velocity applied being such that expansion of the catalyst bed takes place. Another attractive embodiment of the hydrodesulphurization without catalyst replenishment of residual hydrocarbon oils is one in which the hydrocarbon oil is passed together with hydrogen through a vertically disposed fixed bed in the upward direction and in which the adiabatic rise in temperature resulting from the hydrodesulphurization reaction is kept below 20°C by recycling part of the desulphurized product to the catalyst bed and/or injecting hydrogen at various points into the catalyst bed.

In the catalytic hydrosulphurization of residual hydrocarbon oils without catalyst replenishment, use is generally made of catalyst particles having a specific average particle diameter of 0.5-2.5 mm. If the desulphurization is performed by passing the hydrocarbon oil to be desulphurized together with hydrogen through a vertically disposed fixed catalyst bed in the upward or downward direction, use is preferably made of catalyst particles with a specific average particle diameter of 0.6-2.0 mm.

The relationship found between $p$ and $d$ and $P_{H_2}$ enables catalysts to be prepared for the hydrodesulphurization of residual hydrocarbon oils at a given $P_{H_2}$, which show a good performance. If a catalyst or catalyst carrier is available, of which $d$ is not optimum in relation to $p$ at a given $P_{H_2}$, it is possible to prepare therefrom a good catalyst or catalyst carrier by adapting $d$ to $p$. This can be effected in a simple way by increasing or reducing the particle size of the catalyst or catalyst carrier (for example by bonding the particles with or without the use of a binding agent or by grinding the particles).

In the preparation of good desulphurization catalysts according to the invention starting from a certain catalyst or catalyst carrier material the following problem may arise. The optimum $d$ at a given $P_{H_2}$ corresponding to the p of the material from which the catalyst must be prepared may be so small that difficulties areise when such small catalyst particles are used for catalytic hydrodesulphurization. In this case it is preferred that agglomerates be formed from the small particles, of which d is optimum in relation to $p$ and $P_{H_2}$, which agglomerates have more than 10 % of their pore volume in pores with a diameter above 100 nm. It is preferred that from the small particles agglomerates be formed having more than 25% of their pore volume in pores with a diameter above 100 nm. The use of these porous catalyst agglomerates in the hydrodesulphurization of residual hydrocarbon oils offers the same advantages as the use of the small optimum catalyst particles without the drawbacks inherent in the use of these small catalyst particles. The porous catalyst or catalyst carrier agglomerates may very suitably be prepared from small optimum particles by binding them with or without the use of a binding agent in the presence of a material which is incorporated in the agglomerates and subsequently removed therefrom by evaporation, combustion, solution, leaching or otherwise, leaving sufficient pores with a diameter above 100 nm in the agglomerates. Suitable compounds for this purpose are cellulose-containing materials, polymers and compounds soluble in organic or inorganic solvents.

The reaction conditions applied in the hydrodesulphurization process according to the invention may vary widely. The hydrodesulphurization is preferably carried out at a temperature of 300°-475°C, a hydrogen partial pressure of 50-200 bar, a space velocity of 0.1-10 pbw of fresh feed per pbv of catalyst per hour and a hydrogen/feed ratio of 150-2000 Nl $H_2$/kg feed. Particularly preferred are a temperature of 350-445°C, a hydrogen partial pressure of 80-180 bar, a space velocity of 0.5-5 pbw of fresh feed per pbv of catalyst per hour and a hydrogen/feed ratio of 250-1000 Nl $H_2$/kg feed.

The hydrodesulphurization process according to the present invention may very suitably be preceded by a demetallization process. As a result of the demetallization, deactivation of the hydrodesulphurization catalyst is considerably depressed. As feeds for this combined process, residual hydrocarbon oils having a total vanadium and nickel content above 120 ppmw as well as residual hydrocarbon oils having a total vanadium and nickel content of at most 120 ppmw may be applied. The demetallization of the residual hydrocarbon oil concerned should be carried out in such a way that a product with a total vanadium and nickel content of at most 120 ppmw is obtained.

The demetallization of residual hydrocarbon oils is preferably carried out by passing the hydrocarbon oil at elevated temperature and pressure and in the presence of hydrogen in upward, downward or radial direction through one or more vertically disposed reactors comprising a fixed or moving bed of suitable catalyst particles. A very attractive embodiment of the demetallization process is one in which the hydrocarbon oil is passed through a vertically disposed catalyst bed in which during operation fresh catalyst is periodically introduced at the top of the catalyst bed and spent catalyst is withdrawn at the bottom thereof (demetallization in bunker flow operation). Another very attractive embodiment of the demetallization process is one in which several reactors comprising a fixed catalyst bed are present, which are alternately used for demetallization; while the demetallization is carried out in one or more of these reactors, the catalyst is replenished in the other reactors (demetallization in fixed bed swing operation). If desired, the demetallization may also be carried out by suspending the catalyst in the hydrocarbon oil to be demetallized (demetallization in slurry phase operation). Excellent catalysts for demetallization of residual hydrocarbon oils are catalysts comprising one or more metals having hydrogenation activity on a carrier, which catalysts meet the following requirements 1. the pore volume is larger than 0.4 ml/g,
2. the percentage of the pore volume that consists of pores with a diameter above 100 nm ($v$) is smaller than 50 and
3. the quotient of $p$ and $d$ is larger than 10− 0.15 v.

If the desulphurization according to the invention is preceded by a demetallization, the demetallization is preferably carried out in bunker flow operation or in fixed bed swing operation and the desulphurization in conventional fixed bed operation.

Examples of feeds to which the hydrodesulphurization process according to the invention (either or not preceded by a demetallization process) may be applied are crude oils and residues obtained by distilling crude oils at atmospheric and reduced pressure. It is preferred that the feed to be desulphurized should contain less than 50 ppmw and in particular less than 25 ppmw of alkali metal and/or alkaline earth metal. If the alkali metal and/or alkaline earth metal content of the feed is too high, it may be reduced, for example by desalting the feed.

The invention will now be elucidated with the aid of the following examples.

EXAMPLES

Catalyst preparation

Catalyst A

A catalyst comprising 4.7 pbw cobalt and 11.4 pbw molybdenum per 100 pbw alumina was prepared as follows:

An aqueous solution of 1051 g ammonium molybdate (the ammonium molybdate used in the examples of this patent applicaton had a molybdenum content of 54.3 %w) was mixed with an aqueous solution of 1163 g cobalt nitrate 6 aq. After addition of 350 ml 25% ammonia the mixture was diluted with water to a volume of 3800 ml. This mixture was used to impregnate 5000 g 1.5 mm alumina extrudates. After 15 minutes the impregnated material was dried at 120°C for 18 hours and calcined at 500°C for 3 hours.

Catalyst B

A catalyst comprising 4.7 pbw cobalt and 11.4 pbw molybdenum per 100 pbw alumina was prepared as follows:

An aqueous solution of 35.1 g ammonium molybdate was mixed with an aqueous solution of 38.9 cobalt nitrate 6 aq. After addition of 10 ml 25% ammonia the mixture was diluted with water to a volume of 125 ml. This mixture was used to impregnate 166.9 g 1.5 mm alumina extrudates. After 15 minutes the impregnated material was dried at 120°C for 18 hours and calcined at 500°C for 3 hours.

Catalyst C

A catalyst comprising 4.7 pbw cobalt and 11.4 pbw molybdenum per 100 pbw alumina was prepared as follows:

An aqueous solution of 29.9 g ammonium molybdate was mixed with an aqueous solution of 33.1 g cobalt nitrate 6 aq. After addition of 10 ml 25% ammonia the mixture was diluted with water to a volume of 108 ml. This mixture was used to impregnate 142.3 g 1.5 mm alumina extrudates. After 15 minutes the impregnated material was dried at 120°C for 18 hours and calcined at 500°C for 3 hours.

Catalysts D and E

Two catalysts comprising 3.8 pbw cobalt and 9.5 pbw molybdenum per 100 pbw alumina was prepared as follows:

An aqueous solution of 876 g ammonium molybdate and 1000 ml 30% $H_2O_2$ was mixed with an aqueous solution of 940 g cobalt nitrate 6 aq. After the mixture had been diluted with water to a volume of 3450 ml; it was used to impregnate 5000 g 0.8 mm alumina extrudates. After 30 minutes the impregnated material was dried at 120°C for 18 hours and calcined at 500°C for 3 hours. Part of catalyst D thus obtained was crushed to prepare a catalyst E having a $d$ of 0.2 mm.

Catalyst F

A quantity of 23.2 kg of an aqueous solution containing 5.256 kg sodium silicate ($SiO_2$ content: 26.5 %w) was warmed up to 40°C. The pH of the solution was decreased from 11.1 to 6 by addition of 2200 ml 6 N $HNO_3$ in 30 minutes with stirring. The silica gel obtained was aged for 24 hours at 40°C. A quantity of 2448 g of an aqueous solution containing 1528 g Al($NO_3$)$_3$.9 $H_2O$ and having a temperature of 40°C was added to the mixture in 5 minutes with stirring. After another 10 minutes stirring the pH of the mixture was increased to 4.8 by addition of 25% ammonia. After 10 minutes the pH of the mixture was further increased to 5.5 (Total ammonia consumption about 900 ml). The silica-alumina cogel was filtered off and washed with water until it was sodium free. The gel was extruded to 1.5 mm extrudates. the extrudates were dried at 120°C and calcined at 500°C.

A quantity of 620 g of this silica-alumina cogel was neutralized with 6.2 l 0.1 molar $NH_4NO_3$ solution and 15 ml 25% ammonia. The silica-alumina was filtered-off, washed with water and dried at 120°C.

The above-mentioned silica-alumina (95 %w dry material) was used as carrier for a catalyst comprising 2 pbw nickel and 16 pbw molybdenum per 100 pbw silica-alumina. The catalyst was prepared as follows:

An aqueous solution of 37.7 g nickel formate 2 aq was mixed with an aqueous solution of 176.4 g ammonium molybdate. After addition of 110 ml monoethanolamine the mixture was diluted with water to a volume of 700 ml. This mixture was used to impregnate 630 g of the abovementioned silica-alumina (598.5 g dry material). After 15 minutes the impregnated material was dried at 120°C for 18 hours and calcined at 500°C for 3 hours.

Catalyst G

A quantity of 116.25 kg of an aqueous solution containing 26.25 kg sodium silicate ($SiO_2$ content: 26.5 %w) was warmed up to 40°C. The pH of the solution was decreased to 6 by addition of 6N $HNO_3$ in 30 minutes with stirring. The silica gel obtained was aged for 140 hours at 40°C with stirring. A quantity of 30 l of an aqueous solution containing 7.66 kg (Al($NO_3$)$_3$.9$H_2O$ and having a temperature of 40°C was added to the mixture in 5 minutes with stirring. After another 10 minutes stirring the pH of the mixture was increased to 4.8 by addition of 25% ammonia. After 10 minutes the pH of the mixture was further increased to 5.5. The silica-alumina cogel was isolated by centrifuging and washed until it was sodium-free. This cogel (12.4% dry material) was used as the carrier for a catalyst comprising 2 pbw nickel and 16 pbw molybdenum per 100 pbw silica-alumina. The catalyst was prepared as follows:

A quantity of 1008 g silica-alumina cogel (= 125 g dry material) was kneaded for 10 minutes. Subsequently 7.87 g nickel formate 2 aq was added and the material was again kneaded for 5 minutes. A solution of 36.83 g ammonium molybdate in a small amount of water and $H_2O_2$ (molar ratio $H_2O_2$/Mo: 0.25) was added and the mixture keaded for 1 hour. The product was extruded to 1.2 mm extrudates. The extrudates were dried at 120°C for 18 hours and calcined at 500°C for 3 hours.

Catalyst H

A catalyst comprising 4.3 pbw nickel and 10.9 pbw molybdenum per 100 pbw alumina was prepared as follows:

An aqueous solution containing 11.9 g molybdenum as ammonium molybdate and 7.1 g $H_2O_2$ (molar ratio $H_2O_2$/Mo : 0.5) was mixed with an aqueous solution containing 4.73 g nickel as nickel nitrate. After the mixture had been diluted with water to a volume of 110 ml, it was used to impregnate 110 g alumina. After 15 minutes the impregnated material was dried at 120°C for 18 hours and calcined at 500°C for 3 hours. The alumina used as the carrier had been obtained by extrusion of a spray-dried alumina. The alumina extrudates had the following properties: pore volume : 0.68 ml/g pore volume in pores with a diameter $\geq 0.7 \times p$ and $\leq 1.7 \times p$: 0.56 ml/g, surface area: 250 m²/g, % of the pore volume in pores with a diameter < 0.7 × p: 9%, % of the pore volume in pores with a diameter > 1.7 × p: 7.4%, % of the pore volume in pores with a diameter > 100 nm: 2.0%, specific average pore diameter (p): 13.0 nm,
specific average particle diameter (d): 1.5 nm.

Catalyst I

A catalyst comprising 4.3 pbw cobalt and 10.9 pbw molybdenum per 100 pbw alumina was prepared as follows:

An aqueous solution containing 28.6 g ammonium molybdate and 28.4 ml 30% $H_2O_2$ was mixed with an aqueous solution of 30.3 g cobalt nitrate 6 aq. After the mixture had been diluted with water to a volume of 108 ml it was used to impregnate 142.3 g of the same alumina extrudates as those applied for the preparation of catalyst H. After 15 minutes the impregnated material was dried at 120°C for 18 hours and calcined at 500°C for 3 hours.

Catalyst J

A catalyst comprising 4.3 pbw cobalt and 10.9 pbw molybdenum per 100 pbw alumina was prepared as follows:

An aqueous solution containing 60.22 g ammonium molybdate and 19.3 g 30% $H_2O_2$ was mixed with an aqueous solution of 63.7 g cobalt nitrate (Co content: 20.25 %w). After the mixture had been diluted with water to a volume of 240 ml, it was used to impregnate 300 g alumina extrudates obtained by extrusion of a spray-dried alumina. After 20 minutes the impregnated material was dried at 120°C for 18 hours and calcined at 500°C for 3 hours.

Catalyst K

A catalyst comprising 4.3 pbw nickel and 10.9 pbw molybdenum per 100 pbw alumina was prepared as follows:

An aqueous solution containing 30.1 g ammonium molybdate and 7.5 ml 30 % $H_2O_2$ was mixed with an aqueous solution of 31.9 g nickel nitrate 6 aq. After the mixture had been diluted with water to a volume of 200 ml it was used to impregnate 150 g spherical alumina particles obtained by means of the oil drop method. After 15 minutes the impregnated material was dried at 120°C for 18 hours and calcined at 500°C for 3 hours. The spherical alumina particles had the following properties:

pore volume: 0.80 ml/g,
pore volume in pores with a diameter $\geq 0.7 \times p$ and $\leq 1.7 \times p$; 0.58 ml/g,
surface area: 230 m²/g,
% of the pore volume in pores with a diameter $<0.7 \times p$: 18%,
% of the pore volume in pores with a diameter $>1.7 \times p$ : 10%,
% of the pore volume in pores with a diameter $>100$ nm: 2.7%,
specific average pore diameter (p): 22.0 nm,
specific average particle diameter (d): 1.7 mm.

Catalyst L

A catalyst comprising 4.3 pbw cobalt and 10.9 pbw molybdenum per 100 pbw alumina was prepared as follows:

An aqueous solution containing 20.0 g ammonimum molybdate and 20 g 30% $H_2O_2$ was mixed with an aqueous solution of 21.2 g cobalt nitrate 6 aq. After the mixture had been diluted with water to a volume of 110 ml it was used to impregnate 100 g of the same spherical alumina particles as those applied for the preparation of catalyst K. After 15 minutes the impregnated material was dried at 120°C for 18 hours and calcined at 500°C for 3 hours.

Catalysts M and N

Two catalysts comprising 4.3 pbw nickel and 10.9 pbw molybdenum were prepared as follows:

An aqueous solution of 57.2 g ammonium molybdate was mixed with an aqueous solution 38.6 g nickel formate 2 aq. After addition of 65 ml monoethanolamine the mixture was diluted with water to a volume of 280 ml. This mixture was divided into two equal portions and each of these portions was used to impregnate 142.5 g spherical alumina particles which had been steamed at 475°C and subsequently calcined either at 500°C or at 700°C for 3 hours. The spherical alumina particles were the same as those applied for the preparation of catalysts K and L. For the preparation of catalyst M use was made of the alumina particles which had been calcined at 700°C; the alumina particles which had been calcined at 500°C were applied as carrier for catalyst N. After 15 minutes the impregnated materials were dried at 120°C for 18 hours and calcined at 500°C for 3 hours.

Catalyst O

A catalyst comprising 4.3 pbw nickel and 10.9 pbw molybdenum per 100 pbw alumina was prepared as follows:

An aqueous solution of 12.0 g ammonium molybdate was mixed with an aqueous solution of 8.1 g nickel formate 2 aq. After addition of 13.5 ml monoethanolamine the mixture was diluted with water to a volume of 60 ml. This mixture was used to impregnate 60 g of the same steamed spherical alumina particles as those applied for the preparation of catalyst M. After 15 minutes the impregnated material was dried at 120°C for 18 hours and calcined at 500°C for 3 hours.

Catalyst P

A quantity of 11600 g of an aqueous solution containing 2628 g sodium silicate ($SiO_2$ content: 26.5 %w) was warmed up to 40°C. The pH of the solution was decreased from 11.6 to 6 by the addition of 1160 ml 6 N $HNO_3$ in 30 minutes with stirring. Gelation occurred at pH = 10.5. The silica gel obtained was aged for 140 hours at 40°C. A quantity of 1224 g of an aqueous solution containing 780 g $Al(NO_3)_3.9H_2O$ was added to the mixture in 5 minutes with stirring. The pH of the mixture was increased to 4.8 by the addition of 435 ml concentrated ammonia in 20 minutes. After 20 minutes the pH of the mixture was further increased to 5.5 by the addition of 20 ml concentrated ammonia. The silica-alumina cogel was isolated by centrifuging and washed six times, each time with 15 l water, until it was sodium-free. The gel was extruded to 1.5 mm extrudates. The extrudates were dried at 120°C for 18 hours and calcined at 500°C for 3 hours.

A quantity of 377 g of this silica-alumina cogel was mixed with 3770 ml 0.1 molar $NH_4NO_3$. The pH of this mixture was increased from 4.6 to 7 by the addition of 7.8 ml concentrated ammonia. After 2 hours the silica-alumina was filtered off, washed with 2 l water and dried at 100°C.

The above-mentioned silica-alumina (94.5 %w dry material) was used as the carrier for a catalyst comprising 2 pbw nickel and 16 pbw molybdenum per 100 pbw silica-alumina. The catalyst was prepared as follows:

An aqueous solution of 23 g nickel formate 2.aq was mixed with an aqueous solution of 108 g ammonium molybdate. After addition of 70 ml monoethanolamine the mixture was diluted with water to a volume of 500 ml. This mixture was used to impregnate 386 g of the above-mentioned silica-alumina (365 g dry material). After 15 minutes the impregnated material was dried at 120°C for 18 hours and calcined at 500°C for 3 hours.

Catalyst Q

A catalyst comprising 1 pbw nickel and 8 pbw molybdenum per 100 pbw silica alumina was prepared as follows:

An aqueous solution of 11.6 g nickel formate 2 aq was mixed with an aqueous solution of 54.5 g ammonium molybdate. After addition of 45 ml monoethanolamine the mixture was diluted with water to a volume of 500 ml. This mixture was used to impregnate 388 g of the same silica-alumina as that applied for the preparation of catalyst P. After 15 minutes the impregnated material was dried at 120°C for 18 hours and calcined at 500°C for 3 hours.

Catalyst R

A catalyst comprising 4.3 pbw cobalt and 10.9 pbw molybdenum per 100 pbw alumina was prepared as follows:

An aqueous solution containing 15.25 g molybdenum as ammonium molybdate and 0.5 mol $H_2O_2$/at Mo was mixed with an aqueous solution containing 6.02 g cobalt as cobalt nitrate. After the mixture had been diluted with water to a volume of 130 ml, it was used to impregnate 140 g alumina. After 15 minutes the impregnated material was dried at 120°C for 18 hours and calcined at 500°C for 3 hours.

Catalyst S

A catalyst comprising 4.3 pbw cobalt and 10.9 pbw molybdenum per 100 pbw alumina was prepared as follows:

An aqueous solution of 8.8 g nickel formate 2 aq. and 15 ml monoethanolamine was mixed with an aqueous solution of 13.0 g ammonium molybdate. After the mixture had been diluted with water to a volume of 60 ml, it was used to impregnate 65 g alumina particles. After 15 minutes the impregnated material was dried at 120°C for 18 hours and calcined at 500°C for 3 hours.

Catalyst T and U

A quantity of 116,25 kg of an aqueous solution containing 26.25 kg sodium silicate ($SiO_2$ content: 26.5 %w) was warmed up to 40°C. The pH of the solution was decreased to 6 by the addition of 6 N $HNO_3$ in 30 minutes with stirring. The silicagel obtained was aged for 140 hours at 40°C with stirring. A quantity of 30 l of an aqueous solution containing 7.66 kg $Al(NO_3)_3.9H_2O$ and having a temperature of 40°C was added to the mixture in 5 minutes with stirring. After another 10 minutes stirring the pH of the mixture was increased to 4.8 by addition of 25% ammonia. After 10 minutes the ph of the mixture was further increased to 5.5. The silica-alumina cogel was isolated by centrifuging and washed with water of 60°C until it was sodium-free.

A quantity of 4.6 kg (14 %w dry material) of this silica-alumina cogel was treated three times with 5 l 0.1 molar $NH_4NO_3$, washed with water and filtered-off.

The above-mentioned silica-alumina (12.3 %w dry material) was used as the carrier for two catalysts each comprising 1 pbw nickel and 8 pbw molybdenum per 100 pbw silica-alumina. The catalysts were prepared as follows:

A quantity of 3661 g silica-alumina cogel (= 450 g dry material) was kneaded for 10 minutes. Subsequently 14.15 g nickel formate 2 aq was added and the material was again kneaded for 5 minutes. An aqueous solution of 66.3 g ammonium molybdate was added and the mixture kneaded for 1 hour. From this point catalysts T and U were obtained by extrusion to 1.3 and 1.6 mm extrudates, respectively. The extrudates were dried at 100°C and calcined at 500°C for 3 hours.

Catalysts V and W

Two catalysts comprising 3.8 pbw cobalt and 9.5 pbw molybdenum per 100 pbw alumina was prepared as follows:

An aqueous solution of 876 g ammonium molybdate and 1000 ml 30% $H_2O_2$ was mixed with an aqueous solution of 940 g cobalt nitrate 6 aq. After the mixture had been diluted with water to a volume of 3500 ml, it was used to impregnate 5000 g 1.5 mm alumina extrudates. After 30 minutes the impregnated material was dried at 120°C for 18 hours and calcined at 500°C for 3 hours. Part of this catalyst V was crushed to prepare a catalyst W having a $d$ of 0.8 mm.

Catalyst X

A catalyst comprising 4.3 pbw nickel and 10.9 pbw molybdenum per 100 pbw alumina was prepared as follows:

An aqueous solution of 11.5 g nickel formate 2 aq. and 20 ml monoethanolamine was mixed with an aqueous solution of 17.1 g ammonium molybdate. After the mixture had been diluted with water to a volume of 80 ml, it was used to impregnate 85 g alumina particles. After 15 minutes the impregnated material was dried at 120°C for 18 hours and calcined at 500°C for 3 hours.

Catalyst Y

A catalyst comprising 4.3 pbw nickel and 10.9 pbw molybdenum per 100 pbw alumina was prepared as follows:

An aqueous solution of 2.01 kg ammonium molybdate was mixed with an aqueous solution of 2.13 kg nickel nitrate 6 aq. After addition of 6 l 25% ammonia the mixture was diluted with water to a volume of 11 l. This mixture was used to impregnate 10 kg alumina. After 15 minutes the impregnated material was dried at 120°C for 18 hours and calcined at 500°C for 3 hours.

Catalyst Z

A catalyst comprising 4.3 pbw nickel and 10.9 pbw molybdenum per 100 pbw alumina was prepared as follows:

An aqueous solution of 44.13 g ammonium molybdate containing monoethanolamine was mixed with an aqueous solution of 30.74 g nickel formate 2 aq containing monoethanolamine. After the mixture had been diluted with water to a volume of 190 ml, it was used to impregnate 220 g alumina. After 15 minutes the impregnated material was dried at 120°C for 18 hours and calcined at 500°C for 3 hours.

Hydrodesulphurization experiments

A residual hydrocarbon oil having a total vanadium and nickel content of 62 ppmw, a $C_5$-asphaltenes content of 6.4 %w and a sulphur content of 3.9 %w, which oil had been obtained as a residue in the atmospheric distillation of a Middle-East crude oil was catalytically hydrodesulphurized without catalyst replenishment and with the use of catalysts A – Z. To this end the oil together with hydrogen was passed through a cylindrical fixed catalyst bed in the downward direction at a temperature of 420°C, a hydrogen partial pressure between 70 and 200 bar, an exit gas rate of 250 Nl/kg of fresh feed and a space velocity of 4.35 kg of oil/kg of catalyst per hour. The catalysts were applied in the form of their sulphides.

The performance of a catalyst for the hydrodesulphurization of residual hydrocarbon oils without catalyst replenishment may be described with the aid of the catalyst life and the average activity ($k_{average}$), which are defined as follows:

The catalyst life (expressed in kg feed/kg catalyst) is the maximum amount of residual oil which can be hydrodesulphurized over the catalyst before the catalyst shows a rapid deactivation.

The average activity (expressed in kg feed/kg catalyst.hour.(%w S) ) is the activity of the catalyst at the point where half the catalyst life has been reached.

The results of the hydrodesulphurization experiments together with the properties of the catalysts applied are given in Table I. The specific average pore diameter (p) of the catalysts was calculated from a complete pore diameter distribution, which had been determined with the aid of the nitrogen adsorption/desorption method in combination with the mercury penetration method, as mentioned hereinbefore.

Table I

| Exp. No. | Cat. No. | $P_H$, bar | Pore volume, ml/g | Pore volume in pores with a diam. 0.7xp and 1.7xp, ml/g | B.E.T. surface area, m²/g | % of the pore volume in pores with a diam.<0.7xp |
|---|---|---|---|---|---|---|
| 1 | A | 125 | 0.54 | 0.42 | 202 | 16.7 |
| 2 | B | 150 | 0.57 | 0.48 | 154 | 14.0 |
| 3 | B | 125 | 0.57 | 0.48 | 154 | 14.0 |
| 4 | C | 150 | 0.58 | 0.51 | 177 | 10.3 |
| 5 | D | 100 | 0.50 | 0.47 | 303 | 2.8 |
| 6 | E | 150 | 0.50 | 0.47 | 303 | 2.8 |
| 7 | F | 100 | 0.90 | 0.83 | 239 | 0.2 |
| 8 | G | 130 | 0.82 | 0.69 | 250 | 4.9 |
| 9 | H | 125 | 0.62 | 0.53 | 226 | 8.1 |
| 10 | H | 100 | 0.62 | 0.53 | 226 | 8.1 |
| 11 | I | 125 | 0.62 | 0.53 | 226 | 8.1 |
| 12 | J | 125 | 0.53 | 0.43 | 201 | 5.7 |
| 13 | K | 150 | 0.71 | 0.53 | 219 | 18.3 |
| 14 | L | 150 | 0.71 | 0.53 | 211 | 16.9 |
| 15 | M | 150 | 0.83 | 0.63 | 157 | 15.7 |
| 16 | N | 150 | 0.98 | 0.80 | 157 | 16.3 |
| 17 | O | 150 | 0.84 | 0.68 | 173 | 10.7 |
| 18 | P | 150 | 0.81 | 0.66 | 278 | 1.2 |
| 19 | Q | 150 | 0.81 | 0.69 | 271 | 1.2 |
| 20 | R | 100 | 0.53 | 0.47 | 185 | 1.9 |
| 21 | S | 100 | 0.76 | 0.72 | 198 | 0.1 |
| 22 | T | 100 | 0.76 | 0.69 | 370 | 3.9 |
| 23 | U | 100 | 0.76 | 0.69 | 370 | 3.9 |
| 24 | A | 100 | 0.54 | 0.42 | 202 | 16.7 |
| 25 | C | 125 | 0.58 | 0.51 | 177 | 10.3 |
| 26 | D | 125 | 0.50 | 0.47 | 303 | 2.8 |
| 27 | G | 150 | 0.82 | 0.69 | 250 | 4.9 |
| 28 | H | 150 | 0.62 | 0.53 | 226 | 8.1 |
| 29 | M | 125 | 0.83 | 0.63 | 157 | 15.7 |
| 30 | M | 100 | 0.83 | 0.63 | 157 | 15.7 |
| 31 | O | 100 | 0.84 | 0.68 | 173 | 10.7 |
| 32 | W | 125 | 0.51 | 0.04 | 254 | 4.0 |
| 33 | X | 125 | 0.68 | 0.22 | 241 | 5.9 |
| 34 | C | 70 | 0.58 | 0.51 | 177 | 10.3 |
| 35 | D | 200 | 0.50 | 0.47 | 303 | 2.8 |
| 36 | F | 150 | 0.90 | 0.83 | 239 | 0.2 |
| 37 | M | 80 | 0.83 | 0.63 | 157 | 15.7 |
| 38 | R | 150 | 0.53 | 0.47 | 185 | 1.9 |
| 39 | V | 150 | 0.51 | 0.04 | 254 | 4.0 |
| 40 | Y | 150 | 0.70 | 0.20 | 225 | 12.9 |
| 41 | Y | 100 | 0.70 | 0.20 | 225 | 12.9 |
| 42 | Z | 150 | 0.63 | 0.36 | >100 | 27.0 |

| Exp. No. | % of the pore volume in pores with a diam.>1.7xp | % of the pore volume in pores with a diam. >100 nm | p, nm | d, mm | $k_{average}$, kg/feed/kg cat. ht(%w S) | cat.life, kg feed/kg cat. |
|---|---|---|---|---|---|---|
| 1 | 5.6 | 1.3 | 14.1 | 1.5 | 2.5 | 12,000 |
| 2 | 1.8 | 1.0 | 16.8 | 1.5 | 2.9 | 10,000 |
| 3 | 1.8 | 1.0 | 16.8 | 1.5 | 2.1 | >15,000 |
| 4 | 1.7 | 1.1 | 18.3 | 1.5 | 2.2 | 15,000 |
| 5 | 3.2 | 6.0 | 4.7 | 0.8 | 4.0 | 6,400 |
| 6 | 3.2 | 6.0 | 4.7 | 0.2 | 2.5 | >4,500 |
| 7 | 7.8 | 2.5 | 8.0 | 1.5 | 2.2 | 8,700 |
| 8 | 11.0 | 2.5 | 10.6 | 1.2 | 2.4 | >6,000 |
| 9 | 6.5 | 2.1 | 12.6 | 1.5 | 3.4 | >4,000 |
| 10 | 6.5 | 2.1 | 12.6 | 1.5 | 3.2 | >6,000 |
| 11 | 6.5 | 2.1 | 12.6 | 1.5 | 3.4 | >4,000 |
| 12 | 13.2 | 3.8 | 11.5 | 1.7 | 3.0 | >4,000 |
| 13 | 7.0 | 2.8 | 21.0 | 1.7 | 3.3 | 5,200 |
| 14 | 8.5 | 2.8 | 21.0 | 1.7 | 3.3 | 5,200 |
| 15 | 8.4 | 2.4 | 22.8 | 1.7 | 2.4 | 6,300 |
| 16 | 2.0 | 3.6 | 22.8 | 1.7 | 2.2 | >4,000 |

Table I-continued

| Exp. No. | Cat. No. | $P_H$, bar | Pore volume, ml/g | Pore volume in pores with a diam. 0.7xp and 1.7xp, ml/g | B.E.T. surface area, m²/g | % of the pore volume in pores with a diam.<0.7xp |
|---|---|---|---|---|---|---|
| 17 |  | 8.3 | 3.6 | 25.6 | 1.7 | 2.3 | 12,000 |
| 18 |  | 17.3 | 6.2 | 10.4 | 0.76 | 2.3 | 4,000 |
| 19 |  | 13.6 | 3.7 | 10.2 | 0.76 | 2.5 | 4,000 |
| 20 |  | 9.4 | 3.8 | 10.0 | 1.6 | 4.5 | 4,350 |
| 21 |  | 5.3 | 2.0 | 10.3 | 1.5 | 4.7 | 5,000 |
| 22 |  | 5.3 | 4.2 | 9.2 | 1.3 | 2.4 | 7,000 |
| 23 |  | 5.3 | 4.2 | 9.2 | 1.6 | 3.7 | 5,000 |
| 24 |  | 5.6 | 1.3 | 14.1 | 1.5 | 1.6 | >15,000 |
| 25 |  | 1.7 | 1.1 | 18.3 | 1.5 | 1.6 | >15,000 |
| 26 |  | 3.2 | 6.0 | 4.7 | 0.8 | 6.0 | 3,200 |
| 27 |  | 11.0 | 2.5 | 10.6 | 1.2 | 3.6 | 3,100 |
| 28 |  | 6.5 | 2.1 | 12.6 | 1.5 | 4.1 | 3,100 |
| 29 |  | 8.4 | 2.4 | 22.8 | 1.7 | 1.9 | >10,000 |
| 30 |  | 8.4 | 2.4 | 22.8 | 1.7 | 1.6 | >10,000 |
| 31 |  | 8.3 | 3.6 | 25.6 | 1.7 | 1.5 | >12,000 |
| 32 |  | 90.0 | 5.9 | 4.6 | 0.8 | 5.8 | 3,000 |
| 33 |  | 61.8 | 8.8 | 7.6 | 0.9 | 1.7 | 3,600 |
|  |  | 1.7 | 1.1 | 18.3 | 1.5 | 0.7 | >15,000 |
| 34 |  |  |  |  |  |  |  |
| 35 |  | 3.2 | 6.0 | 4.7 | 0.8 | 12.0 | 1,750 |
| 36 |  | 7.8 | 2.5 | 8.0 | 1.5 | 7.2 | 2,800 |
| 37 |  | 8.4 | 2.4 | 22.8 | 1.7 | 0.7 | >10,000 |
| 38 |  | 9.4 | 3.8 | 10.0 | 1.6 | 6.4 | 2,100 |
| 39 |  | 90.0 | 5.9 | 4.6 | 1.5 | 4.2 | 2,100 |
| 40 |  | 58.6 | 25.7 | 7.6 | 1.5 | 1.9 | 1,300 |
| 41 |  | 58.6 | 25.7 | 7.6 | 1.5 | 1.3 | >5,000 |
| 42 |  | 15.9 | 11.1 | 13.6 | 0.9 | 0.5 | >4,000 |

Under the conditions applied in these hydrodesulphurization experiments the performance of a catalyst is regarded as excellent if the catalyst life is at least 3500 kg feed/kg catalyst and $K_{average}$ is at least 2.0 kg feed/kg catalyst.hour.(%w S). The performance of a catalyst is regarded as good if the catalyst life is at least 3000 kg feed/kg catalyst and $k_{average}$ is at least 1.5 kg feed/kg catalyst.hour.(%w S).

Experiments 1–33 (in which the catalysts have a life ≥ 3000 and a $k_{average}$ ≥ 1.5) are hydrodesulphurization experiments according to the present invention. In these experiments the applied catalysts have a pore volume above 0.30 ml/g, less than 10% of the pore volume in pores with a diameter above 100 nm and meet the requirement:
$3 \times 10^{-4} \times (P_{H_2})^2 \leq p/(d)^{0.9} \leq 17 \times 10^{-4} \times (P_{H_2})^2$.

The experiments 34–42 (in which the catalysts have a life <3000 or a $k_{average}$ < 1.5) are hydrodesulphurization experiments outside the scope of the present invention. In experiments 34–40 the applied catalysts don't meet the requirement:
$3 \times 10^{-4} \times (P_{H_2})^2 \leq p/(d)^{0.9} \leq 17 \times 10^{-4} \times (P_{H_2})^2$;
in experiment 40 the applied catalyst has moreover more than 10% of the pore volume in pores with a diameter above 100 nm. In experiments 41 and 42 the applied catalysts have more than 10% of the pore volume in pores with a diameter above 100 nm.

The influence of $P_{H_2}$ on catalyst performance appears clearly when the following experiments are compared:
Experiments 4, 25 and 34 with catalyst C
Experiments 5, 26 and 35 with catalyst D
Experiments 7 and 36 with catalyst F
Experiments 15, 29, 30 and 37 with catalyst M
Experiments 20 and 38 with catalyst R Catalysts C, D and M which show an excellent performance for residue hydrosulphurization at a $P_{H_2}$ of 150, 100 and 150 bar, respectively (experiments 4, 5 and 15, respectively), and a good performance at a $P_{H_2}$ of 125, 125 and 125 as well as 100 bar, respectively (experiments 25, 26, 29 and 30, respectively), are less suitable for this purpose at a $P_{H_2}$ of 70, 200 and 80 bar, respectively (experiments 34, 35 and 37, respectively). Catalysts F and R which show an excellent performance for residue hydrodesulphurization at a $P_{H_2}$ of 100 bar (experiments 7 and 20) are less suitable for this purpose at a $P_{H_2}$ of 150 bar (experiments 36 and 38).

Catalysts A–U are novel catalysts according to the invention. Their quotient $p/(d)^{0.9}$ meets the requirement $4.0 \leq p/(d)^{0.9} \leq 20.0$, they have a pore volume above 0.45 ml/g with at least 0.4 ml/g of the pore volume in pores with a diameter of at least $0.7 \times p$ and at most $1.7 \times p$ and moreover the required sharp pore diameter distribution.

Catalysts V–Z don't meet at least two of the requirements for the novel catalysts according to the invention. Catalysts V–Z have less than 0.4 ml/g of the pore volume in pores with a diameter of at least $0.7 \times p$ and at most $1.7 \times p$. Catalysts V–Y have more than 20% of the pore volume in pores with a diameter larger than $1.7 \times p$. Catalysts Y and Z have more than 10% of the pore volume in pores with a diameter larger than 100 nm.

The experiments 1–31 with the novel catalysts according to the invention demonstrate that if these catalysts are applied within the $P_H$ range given by the formula $3 \times 10^{-4} \times (P_{H_2})^2 \leq p/(d)^{0.9} \leq 17 \times 10^{-4} \times (P_{H_2})^2$, they show at least a good performance (life ≥ 3000 and $k_{average}$ ≥ 1.5) for residue hydrodesulphurization. Depending on the quotient $p/(d)^{0.9}$ of these catalysts, a certain restricted $P_{H_2}$ range exists, within the large $P_{H_2}$ range given by the formula, where these catalysts show an excellent performance (life ≥ 3500 and $k_{average}$ ≥ 2.0) for residue hydrodesulphurization. As already indicated in the description of this patent application these restricted $P_H$ ranges are as follows:

$80 \leq P_{H_2} < 110$ bar for catalysts having $4.0 \leq p/(d)^{0.9} \leq 9.0$
$110 \leq P_{H_2} < 135$ bar for catalysts having $7.0 \leq p(d)^{0.9} \leq 12.0$
$135 \leq P_{H_2} \leq 180$ bar for catalysts having $11.5 \leq p/(d)^{0.9} \leq 20.0$.

The preference for carrying out the hydrodesulphurization with these catalysts within a certain restricted $P_H$ range depending on the quotient $p/(d)^{0.9}$ of these catalysts becomes more clear when the following experiments are compared:

Experiments 1 and 24 with catalyst A
Experiments 4 and 25 with catalyst C
Experiments 5 and 26 with catalyst D
Experiments 8 and 27 with catalyst G
Experiments 9, 10 and 28 with catalyst H
Experiments 15, 29 and 30 with catalyst M
Experiments 17 and 31 with catalyst O Catalysts C, M and O with a $p/(d)^{0.9}$ of 12.7, 14.1 and 15.9, respectively, show a good performance (life $\geq$ 3000 and $k_{average} \geq 1.5$) for residue hydrodesulphurization if applied at a $P_{H_2}$ of 125, 125 as well as 100 and 100 bar, respectively (experiments 25, 29, 30 and 31, respectively, carried out outside the preferred $P_{H_2}$ range; $135 \leq P_{H_2} \leq 180$ bar). These catalysts show, however, an excellent performance (life $\geq$ 3500 and $k_{average} \geq 2.0$) if applied at a $P_{H_2}$ of 150 bar (experiments 4, 15 and 17 carried out within the preferred $P_{H_2}$ range; $135 \leq P_{H_2} \leq 180$ bar).

Catalyst D with a $p/(d)^{0.9}$ of 5.7 shows a good performance if applied at a $P_{H_2}$ of 125 bar (experiment 26 carried out outside the preferred $P_{H_2}$ range: $80 \leq P_{H_2} < 110$ bar); this catalyst shows, however, an excellent performance if applied at a $P_{H_2}$ of 100 bar (experiment 5 carried out within the preferred $P_{H_2}$ range: $80 \leq P_{H_2} < 110$ bar).

Catalyst A with a $p/(d)^{0.9}$ of 9.7 shows a good performance if applied at a $P_{H_2}$ of 100 bar (experiment 24 carried out outside the preferred $P_{H_2}$ range: $110 \leq P_{H_2} < 135$ bar); this catalyst shows, however, an excellent performance if applied at a $P_{H_2}$ of 125 bar (experiment 1 carried within the preferred $P_{H_2}$ range: $110 \leq P_{H_2} < 135$ bar).

Catalysts G and H with a $p/(d)^{0.9}$ of 8.9 and 8.7, respectively, show a good performance at a $P_{H_2}$ of 150 bar (experiments 27 and 28, respectively carried out outside the preferred $P_{H_2}$ range: $80 \leq P_{H_2} < 135$ bar); these catalysts show, however, an excellent performance if applied at 130 and 125 as well as 100 bar, respectively (experiments 8, 9 and 10, respectively, carried out at a $P_{H_2}$ within the preferred $P_{H_2}$ range: $80 \leq P_{H_2} < 135$ bar).

EXAMPLE II

By means of the nitrogen adsorption/desorption method combined with the mercury penetration method a complete pore radius distribution of two Ni/Mo/Al$_2$O$_3$ catalysts (catalysts I and II) was determined. Tables II and III show the percentage of the pore volume being present in pores with a given pore radius.

Table II

| pore radius, nm | Catalyst I % of the pore volume |
|---|---|
| 0 – 1 | 9.9 |
| 1 – 2 | 9.3 |
| 2 – 3 | 7.0 |
| 3 – 4 | 6.4 |
| 4 – 5 | 5.7 |
| 5 – 6 | 5.7 |
| 6 – 7 | 5.1 |
| 7 – 8 | 5.1 |
| 8 – 10 | 7.0 |
| 10 – 15 | 9.0 |
| 15 – 20 | 3.8 |
| 20 – 50 | 3.8 |

Table II-continued

| pore radius, nm | Catalyst I % of the pore volume |
|---|---|
| >50 | 22.2 | pore volume: 0.78 ml/g
surface: 238 m²/g

Table III

| pore radius, nm | Catalyst II % of pore volume |
|---|---|
| 0 – 1 | 6.4 |
| 1 – 2 | 6.4 |
| 2 – 3 | 7.2 |
| 3 – 4 | 5.6 |
| 4 – 5 | 3.1 |
| 5 – 6 | 3.1 |
| 6 – 7 | 7.9 |
| 7.0 – 7.5 | 6.3 |
| 7.5 – 8.0 | 6.4 |
| 8.0 – 8.5 | 6.4 |
| 8.5 – 9.0 | 6.3 |
| 9.0 – 9.5 | 5.6 |
| 9.5 – 10.0 | 5.5 |
| 10 – 15 | 7.9 |
| 15 – 20 | 1.6 |
| 20 – 50 | 3.2 |
| >50 | 11.1 | pore volume: 0.63 ml/g
surface: 133 m²/g

Of the catalysts I and II the average bore diameters were determined by three different methods, each used as such in practice.

Method 1:

Calculated by means of the formula $$\text{pore diameter} = \frac{4 \times \text{pore volume}}{\text{surface}} \times 10^3$$

Method 2:

Read off from a graph composed by means of a complete pore radius distribution and in which for the pore diameter range of from 0 to 100 nm, for each pore volume increment smaller than or equal to 10% of the pore volume, the quotient of the pore volume increment and the corresponding pore diameter interval has been plotted as a function of the linear average pore diameter over the relevant pore diameter interval; the pore diameter is read off at the point where the curve reaches a maximum.

Method 3:

Read off from a graph composed by means of a complete pore radius distribution and in which for the pore diameter range of from 0 to 100 nm, for each pore volume increment smaller than or equal to 10% of the pore volume, the quotient of the pore volume increment and the corresponding pore diameter interval has been cumulatively plotted as a function of the linear average pore diameter over the relevant pore diameter interval; the pore diameter is read off at the point corresponding to 50% of the total quotient at 100 nm.

For catalyst I the following average pore diameter values are found by the different methods.

By method 1: 13.1 nm.
By method 2: Undeterminable, since there is no distinct maximum in the curve.

By method 3: 7.6 nm.

For catalyst II the following average pore diameter values are formed by the different methods.
By method 1: 18.9 nm.
By method 2: 16.0 nm.
By method 3: 13.6 nm.

It is seen from this example that the different methods for determining the average pore diameter of the catalyst lead to widely varying results. For determining the specific average pore diameter (p) according to the invention method 3 is used.

EXAMPLE III

A complete sieve analysis was carried out of a crushed Ni/Mo/Al$_2$O$_3$ catalyst having a particle diameter between 0.115 and 1.10. The results of this sieve analysis are shown in Table IV.

Table IV

| Sieve No. (US mesh) | Particle diameter range, mm | % by weight | Average particle diam., mm | Cumulative % by weight |
|---|---|---|---|---|
| 16 – 18 | 1.00 – 1.19 | 1.0 | 1.10 | 100.0 |
| 18 – 20 | 0.84 – 1.00 | 2.3 | 0.92 | 99.0 |
| 20 – 25 | 0.71 – 0.84 | 3.5 | 0.77 | 96.7 |
| 25 – 30 | 0.59 – 0.71 | 5.2 | 0.65 | 93.2 |
| 30 – 35 | 0.50 – 0.59 | 5.5 | 0.55 | 88.0 |
| 35 – 40 | 0.42 – 0.50 | 6.6 | 0.46 | 82.5 |
| 40 – 45 | 0.35 – 0.42 | 8.1 | 0.38 | 75.9 |
| 45 – 50 | 0.297 – 0.35 | 7.1 | 0.32 | 67.8 |
| 50 – 60 | 0.250 – 0.297 | 9.3 | 0.27 | 60.7 |
| 60 – 70 | 0.210 – 0.250 | 8.9 | 0.23 | 51.4 |
| 70 – 80 | 0.177 – 0.210 | 8.5 | 0.19 | 42.5 |
| 80 – 100 | 0.149 – 0.177 | 9.9 | 0.165 | 34.0 |
| 100 – 120 | 0.125 – 0.149 | 10.8 | 0.13 | 24.1 |
| 120 – 140 | 0.105 – 0.125 | 13.3 | 0.115 | 13.3 |

Of this catalyst the average particle diameter was determined by two different methods which are both used in practice.

Method 1:

Calculated as linear average by means of the formula $$\text{particle diameter} = \frac{d_1 + d_2}{2};$$

in which $d_1$ and $d_2$ represent the particle diameter of the largest and the smallest particle respectively.

Method 2:

Read off from a graph composed by means of a complete sieve analysis and in which for every successive sieve fraction the percentage by weight, based on the total weight of the catalyst sample, has been plotted cumulatively as a function of the linear average diameter of the relevant sieve fraction; the particle diameter is read off at the point corresponding to 50% of the total weight.

For this catalyst the following average particle diameter values are found by the different methods.
By method 1: 0.61 mm
By method 2: 0.225 mm It is seen from this example that the different methods for determining the average particle diameter of the catalyst lead to widely varying results. For determining the specific average particle diameter (d) according to the invention method 2 is used.

What is claimed is:

1. A fixed bed process for the catalytic hydrodesulphurization at hydrogen partial pressures of at least 80 and at most 180 bar, at a temperature of 300°–475°C, a space velocity of 0.1–10 pbw of fresh feed per pbv of catalyst per hour and a hydrogen feed ratio of 150–2000 Nl H$_2$/kg feed of residual hydrocarbon oils having a total vanadium and nickel content of at most 120 ppmw and a C$_5$-asphaltene content above 0.5%w wherein a catalyst is applied comprising 0.5–20% w nickel and/or cobalt and 2.5–60% w molybdenum and/or tungsten on an alumina or silica-alumina carrier, said catalyst having a specific average pore diameter, p, in nm, in the range of 4.6 to 25.6 inclusive and a specific average particle diameter, d, in mm, in the range of 0.5 to 2.5, inclusive such that the quotient $p/(d)^{0.9}$ meets the requirement $$3 \times 10^{-4} \times P_{H_2}^2 \leq p/(d)^{0.9} \leq 17 \times 10^{-4} \times P_{H_2}^2,$$

wherein $P_H$ is said hydrogen partial pressure in bar; and said catalyst having a pore volume above 0.45 ml/g, with at least 0.4 ml/g of said pore volume in pores having a diameter of at least $0.7 \times p$ and at most $1.7 \times p$, and a sharp pore diameter distribution characterized by
   a. less than 20% of the pore volume in pores with a diameter smaller than $0.7 \times p$,
   b. less than 20% of the pore volume in pores with a diameter larger than $1.7 \times p$, and
   c. less than 10% of the pore volume in pores with a diameter larger than 100 nm.

2. The process of claim 1 wherein the $P_{H_2}$ applied is at least 80 but less than 110 bar and the catalyst has such a p and d that the quotient $p/(d)^{0.9}$ meets the requirement $4.0 \leq p/(d)^{0.9} \leq 9.0$.

3. The process of claim 1 wherein the $P_{H_2}$ applied is at least 110 but less than 135 bar and the catalyst has such a p and d that the quotient $p/(d)^{0.9}$ meets the requirement $7.0 \leq p/(d)^{0.9} \leq 12.0$ 4. The process of claim 1 wherein the $P_{H_2}$ applied is at least 135 and at most 180 bar and the catalyst has such a p and d that the quotient $p/(d)^{0.9}$ meets the requirement $11.5 \leq p/(d)^{0.9} \leq 20.0$.

5. The process of claim 1 wherein the process is carried out at a temperature of 350°–445°C, and a space velocity of 0.05–5 pbw of fresh feed per pbv of catalyst per hour.

6. The process of claim 1 wherein the desulphurization step is preceded by a demetallization step.

7. The process of claim 1 wherein said residual oils have a total vanadium and nickel content of at least 30 ppmw and a pore volume above 0.5 ml/g and said catalyst contains between 0.4 and 0.8 ml/g of said pore volume in pores having a diameter of at least $0.7 \times p$ and at most $1.7 \times p$.

8. The process of claim 1 wherein the catalyst has such a specific average pore diameter, p and specific average particle diameter d that the quotient $p/(d)^{0.9}$ meets the requirement $34 \times 10^{-5} \times (P_{H_2})^2 \leq p/(d)^{0.9} \leq 141 \times 10^{-5} \times (P_{H_2})^2$.

* * * * *